(12) United States Patent
Lovett et al.

(10) Patent No.: US 8,807,173 B2
(45) Date of Patent: Aug. 19, 2014

(54) REINFORCED PLASTIC HOSE

(75) Inventors: Brad A. Lovett, West Bloomfield, MI (US); David T. Delaney, Bucyrus, OH (US)

(73) Assignee: Cooper-Standard Automotive, Inc., Novi, MI (US)

( * ) Notice: Subject to any disclaimer, the term of this patent is extended or adjusted under 35 U.S.C. 154(b) by 1158 days.

(21) Appl. No.: 12/096,826

(22) PCT Filed: Jan. 30, 2007

(86) PCT No.: PCT/US2007/002647
§ 371 (c)(1),
(2), (4) Date: Jun. 10, 2008

(87) PCT Pub. No.: WO2007/092226
PCT Pub. Date: Aug. 16, 2007

(65) Prior Publication Data
US 2008/0302437 A1 Dec. 11, 2008

Related U.S. Application Data

(60) Provisional application No. 60/764,573, filed on Feb. 2, 2006.

(51) Int. Cl.
*F16L 11/00* (2006.01)
(52) U.S. Cl.
USPC .......... 138/125; 138/123; 138/124; 138/141; 138/137; 428/36.91; 174/47

(58) Field of Classification Search
USPC ......... 138/123–125, 140, 137, 139, 129, 144, 138/103, 130, 174, 141; 174/47; 428/36.91
See application file for complete search history.

(56) References Cited

U.S. PATENT DOCUMENTS

| | | | | | |
|---|---|---|---|---|---|
| 3,245,431 | A | * | 4/1966 | Coe | 138/125 |
| 3,477,474 | A | * | 11/1969 | Mesler | 138/133 |
| 3,522,413 | A | * | 8/1970 | Chrow | 392/468 |
| 3,578,028 | A | * | 5/1971 | Roberts | 138/123 |
| 3,721,271 | A | * | 3/1973 | Chudgar | 138/141 |
| 3,722,550 | A | * | 3/1973 | Matthews | 138/137 |
| 3,755,032 | A | * | 8/1973 | Higbee | 156/86 |
| 3,773,089 | A | * | 11/1973 | Chudgar | 138/132 |
| 3,776,794 | A | * | 12/1973 | Ingham | 156/143 |
| 3,944,453 | A | * | 3/1976 | Chudgar et al. | 156/143 |
| 3,945,867 | A | * | 3/1976 | Heller et al. | 156/143 |
| 4,133,972 | A | * | 1/1979 | Andersson et al. | 174/47 |

(Continued)

FOREIGN PATENT DOCUMENTS

EP 0439898 A2 8/1991

OTHER PUBLICATIONS

Search Report PCT/US07/02647.

(Continued)

*Primary Examiner* — Patrick F Brinson
(74) *Attorney, Agent, or Firm* — Carlson, Gaskey & Olds, P.C.

(57) ABSTRACT

A hose for use in a fluid transfer system includes a first layer that is made of a plastic material and a second layer having fiber strands that are wound about the first layer. Optionally, the hose may also have additional layers to provide added strength, permeation resistance, or other properties.

30 Claims, 3 Drawing Sheets

(56) References Cited

U.S. PATENT DOCUMENTS

| | | | |
|---|---|---|---|
| 4,261,390 A * | 4/1981 | Belofsky | 138/125 |
| 4,522,235 A * | 6/1985 | Kluss et al. | 138/130 |
| 4,842,024 A * | 6/1989 | Palinchak | 138/125 |
| 5,428,706 A * | 6/1995 | Lequeux | 392/472 |
| RE35,081 E * | 11/1995 | Quigley | 428/36.2 |
| 5,538,045 A * | 7/1996 | Piotrowski et al. | 138/149 |
| 5,655,572 A * | 8/1997 | Marena | 138/125 |
| 5,744,206 A * | 4/1998 | Russek et al. | 428/36.3 |
| 6,016,845 A | 1/2000 | Quigley et al. | |
| 6,039,084 A * | 3/2000 | Martucci et al. | 138/137 |
| 6,257,280 B1 * | 7/2001 | Marena | 138/125 |
| 6,670,004 B1 | 12/2003 | Green | 428/35.7 |
| 6,926,038 B1 | 8/2005 | Cook et al. | 8/127 |
| 2001/0018933 A1 * | 9/2001 | Martucci et al. | 138/125 |
| 2004/0062895 A1 | 4/2004 | Sausner et al. | 28/36.91 |

OTHER PUBLICATIONS

Supplementary European Search Report for Application No. 07763524.1 dated Oct. 13, 2010.

International Preliminary Report on Patentability dated Nov. 7, 2008.

* cited by examiner

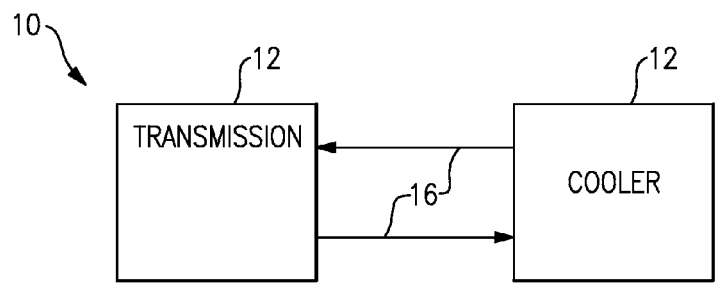
FIG.1A
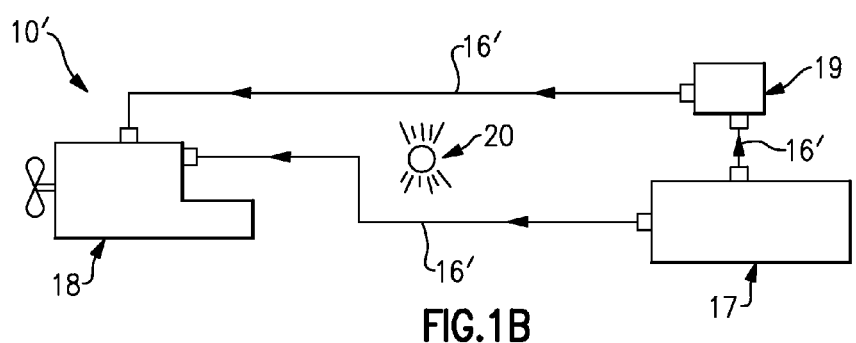
FIG.1B
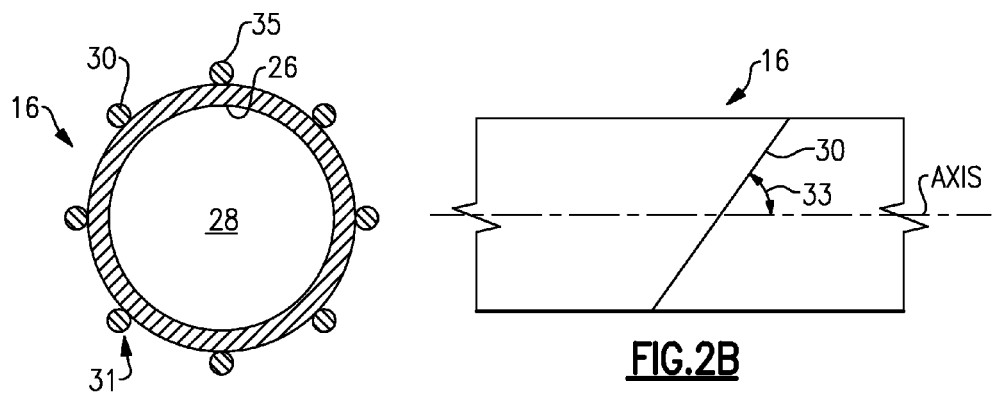
FIG.2A
FIG.2B

REINFORCED PLASTIC HOSE

CROSS REFERENCE TO RELATED APPLICATION

This application is a U.S. national phase of PCT/US2007/002647, filed Jan. 30, 2007, which claims priority to U.S. Provisional Application No. 60/764,573, filed Feb. 2, 2006.

BACKGROUND OF THE INVENTION

The present invention relates to hoses and, more particularly, to reinforced plastic hoses for use in applications requiring relatively high strength.

Plastic and rubber hoses are widely known and used in many different fluid transfer systems, such as automotive applications. For example, rubber hoses are commonly connected between a vehicle transmission and a cooler in automatic transmission cooling applications for communicating hot, high pressure transmission fluid. Under the relatively hot, high pressure conditions, the connections between the rubber hoses and the transmission or the cooler may leak. Furthermore, exposure to the relatively hot, high pressure conditions over a long period of time may degrade the rubber hose to the point of causing a leak or, under extreme conditions, cause the rubber hoses to burst.

In other applications, such as vehicle fuel systems, plastic hoses are typically used instead of or in addition to rubber hoses. Although the plastic of the hose is generally resistant to the fuel transported through the hoses, the relatively hot, high pressure conditions over a long period of time may weaken the connections between the plastic hose and fuel components, or undesirably degrade and weaken the plastic hose.

Therefore, although conventional rubber or plastic hoses are suitable for many fuel systems, there is a desire for even stronger hoses having improved resistance to elevated temperatures and extended durability in relatively demanding fluid transfer systems.

SUMMARY OF THE INVENTION

An example hose for use in a fluid transfer system includes a first layer that is made of a plastic material and a second layer having fiber strands that are wound about the first layer. Optionally, the hose may additional layers to provide added strength, permeation resistance, or other desired properties.

In one example, the fluid transfer system includes a transmission and a cooler. Transmission fluid circulates between the transmission and the cooler through the hose. In another example, the fluid transfer system is a vehicle fuel system that includes a fuel tank that delivers fuel to a vehicle engine and a vapor management system for delivering fuel vapors to the engine. The hose transports the fuel and vapors from the fuel tank to the engine.

BRIEF DESCRIPTION OF THE DRAWINGS

FIG. 1A shows an example fluid transfer system having a transmission and a cooler.

FIG. 1B shows another example fluid transfer system in which fuel is delivered from a fuel tank to an engine.

FIG. 2A shows an example hose having two layers.

FIG. 2B shows an example orientation of a fiber of the hose of FIG. 2A.

DETAILED DESCRIPTION OF THE PREFERRED EMBODIMENTS

Figure 2C:
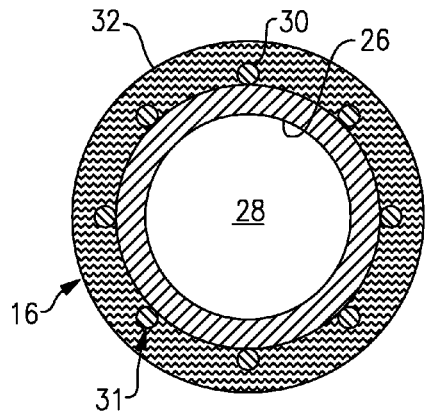
FIG. 2C shows an example hose having three layers.

FIG. 1A illustrates selected portions of an example fluid transfer system 10 having a transmission 12 and a cooler 14 such as an auxiliary cooler or a loop cooler. In this example, the transmission 12 is a hydraulic system that receives an input, such as mechanical power from a vehicle engine, and transmits the input to vehicle wheels. The transmission 12 utilizes fluid to reduce wear and cool the transmission 12.

In the illustrated example, relatively hot, high pressure fluid circulates between the transmission 12 and the cooler 14. The cooler 14 removes heat from the fluid and communicates cooled fluid back to the transmission 12 for another cooling cycle.

FIG. 1B illustrates selected portions of another example fluid transfer system 10' in which fuel is delivered from a fuel tank 17 to an engine 18. In this example, the fluid transfer system also includes a fuel vapor management system 19 for delivering fuel vapors from the fuel tank 17 to the engine 18. Hoses 16' transport fuel and fuel vapors from the fuel tank 17 to the engine. One or more of the hoses 16' is adjacent a heat source 20, such as a catalytic converter, that radiates heat. The radiant heat elevates the temperature of the hoses 16'. It is to be understood that the disclosed fluid transfer systems 10, 10' are not meant to be limiting and that other fluid transfer systems will also benefit from the disclosed example hoses 16, 16'.

In the above examples, the hoses 16, 16' are strong, temperature resistant, and chemically resistant. As will be described below, the hoses 16, 16' include various layers that are made from a variety of different materials. Each material selected has particular characteristics such that the corresponding layer achieves a desired function, such as strength, flexibility, fluid permeation resistance, elution resistance, temperature resistance, conductivity, etc. Further, the layers may be arranged in a variety of different constructions, depending on the particular needs of an application. The following examples illustrate hose constructions and materials for forming the various layers of the hoses 16, 16'. Given this description, one of ordinary skill in the art will be able to recognize other constructions and materials to suit their particular needs.

In the following example constructions, the hoses 16, 16' include at least one layer of a plastic material, such as an extruded plastic layer, and a fiber reinforcement layer adjacent the plastic layer. The term "plastic" as used herein refers broadly to polymer materials, but does not include purely elastomeric materials. Throughout the following examples, like layers are identified using like reference numerals where appropriate.

FIG. 2A illustrates a cross-sectional view of an example hose 16. As can be appreciated, the hoses 16' may include constructions similar to the hoses 16, and therefore the following example constructions for the hose 16 are understood to also apply to the hoses 16'. In this example, the hose 16 includes a first layer 26 that defines a conduit 28 through the hose 16 for fluid transfer. Fiber strands 30 are disposed about the first layer 26 and form a second layer 31 that reinforces the first layer 26. In this example, the first layer 26 is an innermost layer and the second layer 31 having the fiber strands 30 is an outermost layer.

The first layer 26 includes a plastic material selected from any of a variety of different plastic materials, depending upon the desired properties of the hose 16. For example, the first layer 26 includes a thermoplastic material that is resistant to the fluid intended to be transported through the hose 16. In a further example, the thermoplastic material is polyamide, polyester, polyolefin, fluoropolymer, polyphenylene sulfide (PPS), or polyphthalamide (PPA), which each provide the first layer 26 with resistance to hydrocarbon permeation and resistance to elution.

Optionally, the first layer 26 includes a thermoplastic material having an electrically conductive material dispersed therethrough. The electrically conductive material enhances the electrical properties of the first layer 26, such that the surface electrical resistivity of the first layer 26 is between approximately $10^2$ and $10^7$ ohm/sq. For example, in fluid transfer system 10' in a vehicle, electrical dissipation of static electricity may be a desired feature. Desirable fillers and modifying agents for enhancing the electrical resistivity of the first layer 26 include carbon powder, carbon fiber, carbon nanotubes, metallic fiber and mixtures thereof in an amount suitable to obtain a desired level of conductivity through the first layer 26. The amount is sufficient to change a characteristic of the thermoplastic material of the first layer 26 compared to the thermoplastic material without the electrically conductive material.

The fiber strands 30 of the second layer 31 are selected from any of a variety of different types of fiber strands, depending upon the desired properties of the hose 16. In one example, the fiber strands 30 include polyester, polyaramid, aromatic polyamide, glass, Kevlar®, graphite fibers, or combinations thereof.

Optionally, fiber strands 30 include a coating 35 that surrounds the fiber strands 30. For example, the coating 35 is an adhesive that includes the same plastic material as the first layer 26. Likewise, if an additional layer is included on the fiber strands 30, as in the below examples, the coating 35 may include materials that promote bonding with the additional layer. The coating 35 may also protect the fiber strands 30 from abrasion and the like.

The hose 16 is fabricated using known manufacturing techniques. In one example, the first layer 26 is extruded and the fiber strands 30 are wound over the first layer 26. Additional layers, as described below, may be co-extruded with the first layer 26, extruded subsequently to extruding the first layer 26, or extruded prior to extruding the first layer 26.

As illustrated in FIG. 2B, the fiber strands 30 (one shown) are wound about the first layer 26 at an angle 33 relative to a longitudinal axis of the hose 16. The angle 33 is commonly referred to as a braid angle. In one example, a braid angle of about 55° is used to achieve a desirable amount of burst strength and facilitate insertion of a tube connection into the hose 16, as described below.

In some examples, instead of braiding, the fiber strands 30 are spiral wound or knitted about the first layer 26. Generally, a braided construction provides a relatively high strength, a spiral wound construction a relatively lower strength, and a knitted construction a relatively lower strength than the spiral wound.

Instead of, or in addition to the coating 35, the hose 16 may be heated after winding the fiber strands 30 onto the first layer 26 to promote mechanical bonding between the fiber strands 30 and the first layer 26. For example, the hose 16 is heated (or treated otherwise in a secondary operation—i.e. infrared, microwave, etc,) so that the fiber strands 30 and first layer 26 mechanically interlock together.

The fiber strands 30 reinforce the hose 16 and contribute to the hose 16 strength and flexibility. The strength and flexibility of the hose 16 can be tailored by using different numbers of the fiber strands 30. For example, using fewer than eight fiber strands 30 (as shown in the illustration) results in a relatively lower strength and higher flexibility hose 16, while using more than eight fiber strands 30 results in a relatively higher strength and lower flexibility hose 16.

FIG. 2C illustrates another example in which the hose 16 additionally includes a third layer 32 disposed radially outwards (relative to the conduit 28) from the first layer 26. In this example, the third layer 32 is a single, continuous layer that embeds or at least partially surrounds the fiber strands 30. However, in another example (FIG. 2G) where there is less space between the fiber strands 30, the third layer 32 may be disposed on the fiber strands 30 rather than embedded in between. In this example, the third layer 32 is an outermost layer.

The third layer 32 includes a material selected from any of a variety of different materials, depending upon the desired properties of the hose 16. For example, the third layer 32 includes a thermoplastic, a thermoplastic elastomer, a thermoset elastomer, or an elastomer that is resistant to the surrounding environment of the hose 16. For example, the material includes a thermoplastic selected from the polyamide family of polymers, a thermoplastic elastomer, a thermoplastic urethane, an elastomer selected from chloroprene rubber, nitrile rubber, styrene-butadiene rubber, ethylene-propylene rubber, and butyl rubber, or a thermoset elastomer selected from ethylene acrylic rubber (AEM), Vamac® supplied by DuPont De Nemours & Co, and chlorinated polyethylene rubber (CPE).

Figure 2D:
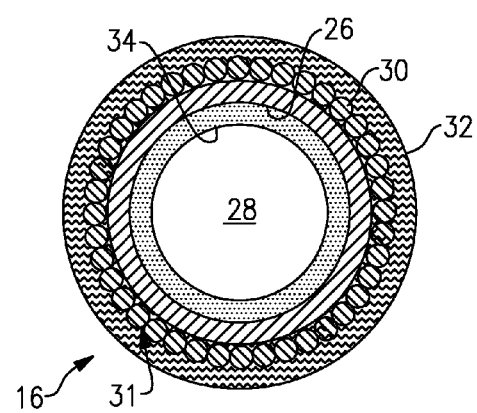
FIG. 2D shows an example hose having four layers.

FIG. 2D illustrates another example in which the hose 16 additionally includes a fourth layer 34 disposed radially inwards from the first layer 26 as an innermost layer. The fourth layer 34 includes a material selected from any of a variety of different materials, depending upon the desired properties of the hose 16. For example, the fourth layer 34 includes a thermoplastic material that is resistant to the fluid intended to be transported through the hose 16 and optionally is electrostatically dissipative as described above for the first layer 26. In a further example, the thermoplastic material is polyamide, polyester, polyolefin, fluoropolymer, polyphenylene sulfide (PPS), or polyphthalamide (PPA), which each provide the fourth layer 26 with resistance to hydrocarbon permeation and resistance to elution. Thus, the fourth layer 34 and the first layer 26 function as a barrier to hydrocarbon permeation.

Figure 2E:
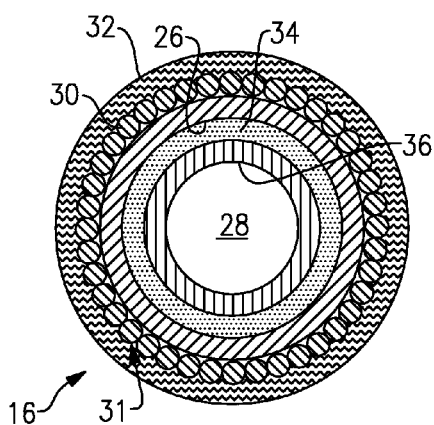
FIG. 2E shows an example hose having five layers.

FIG. 2E illustrates another example in which the hose 16 additionally includes a fifth layer 36 disposed radially inwards from the fourth layer 34 as an innermost layer. The fifth layer 36 includes a material selected from any of a variety of different plastic materials, depending upon the desired properties of the hose 16. For example, the fifth layer 36 includes a thermoplastic material that is resistant to the fluid intended to be transported through the hose 16 and optionally is electrostatically dissipative as described above for the first layer 26. In a further example, the thermoplastic material is polyamide, polyester, polyolefin, fluoropolymer, polyphenylene sulfide (PPS), or polyphthalamide (PPA), which each provide the fifth layer 36 with resistance to hydrocarbon permeation and resistance to elution. Thus, the fifth layer 36, the fourth layer 34, and the first layer 26 function as a barrier to hydrocarbon permeation.

Figure 2F:
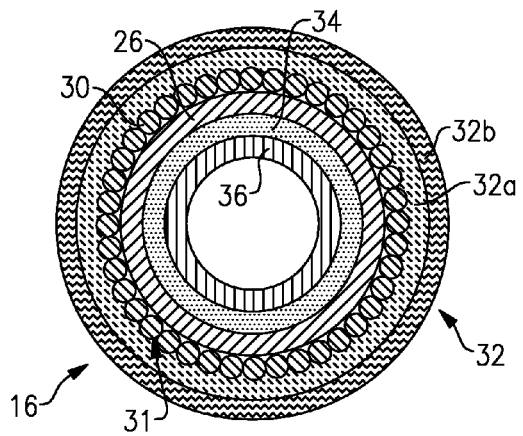
FIG. 2F shows an example hose having a layer that includes two sub-layers.
Figure 2G:
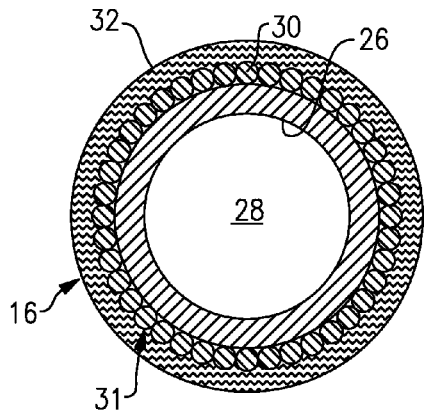
FIG. 2G shows an example hose having three layers.

FIG. 2F illustrates another example in which the third layer 32 includes a first sub-layer 32a and a second sub-layer 32b. As can be appreciated, the third layer 32 as illustrated in any of the above examples may likewise include the first sub-layer 32a and the second sub-layer 32b.

For example, the first sub-layer 32a and the second sub-layer 32b each includes a thermoplastic, thermoplastic elastomer, thermoset elastomer, or an elastomer that is resistant to the surrounding environment of the hose 16. For example, the first sub-layer 32a and the second sub-layer 32b include a thermoplastic selected from the polyamide family of polymers, a thermoplastic elastomer, a thermoplastic urethane, an elastomer selected from chloroprene rubber, nitrile rubber, styrene-butadiene rubber, ethylene-propylene rubber, and butyl rubber, or a thermoset elastomer selected from ethylene acrylic rubber (AEM), Vamac® supplied by DuPont De Nemours & Co, or chlorinated polyethylene rubber (CPE).

In one example, one of the first sub-layer 32a or the second sub-layer 32b includes a material that is resistant to the surrounding environment of the hose 16 and the other of the first sub-layer 32a or the second sub-layer 32b includes a different material that is less expensive than the material selected for the other sub-layer.

Figure 3:
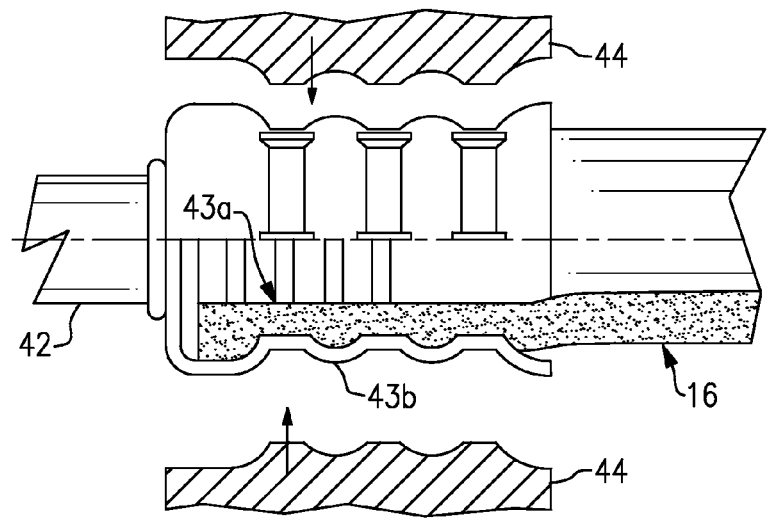
FIG. 3 shows an example assembly between a hose and a tube.

Referring to FIG. 3, the hose 16 is connected to a tube 42, such as a metal tube or connector tube end of the transmission 12, the cooler 14, the engine 18, or the vapor management system 19. In this example, the tube 42 includes an end form 43a and ferrule 43b. The hose 16 is received between the end form 43a and the ferrule 43b. A crimping tool 44 pinches the hose 16, ferrule 43b, and end form 43a to provide a tight and leak-free connection.

The materials selected for the hose 16 contribute to the tight fit of the connection. For example, the hose 16 may have a first layer 26 made of thermoplastic material and a third layer 32 made of a resilient material, such as thermoplastic elastomer or thermoset elastomer. Comparatively, the thermoplastic material is relatively stiff, and the thermoplastic elastomer is relatively flexible and resilient. During the crimping process, the hose 16 is compressed between the end form 43a and ferrule 43b. The resiliency of the thermoplastic elastomer of the third layer 32 under compression provides a sealing force between the hose 16 and the tube 42 for a tight and leak-free connection, while the relatively stiff thermoplastic material provides strength and permeation resistance.

Figure 4:
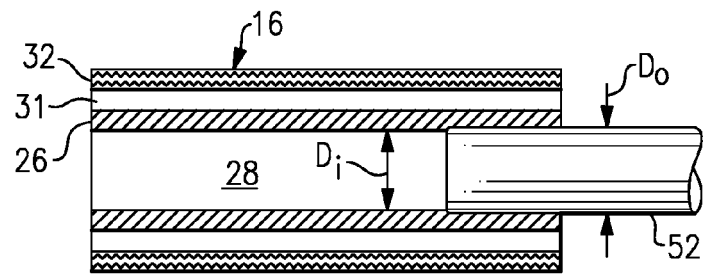
FIG. 4 shows another example assembly between a hose and a tube.

FIG. 4 illustrates a different example in which the hose 16 is connected to a metal tube 52, such as a metal tube or connector tube end of the transmission 12, the cooler 14, the engine 18, or the vapor management system 19. In this example, the metal tube 52 is fitted into the hose 16 to provide a tight and leak-free connection. That is, the metal tube 52 is received into the conduit 28 portion of the hose 16. An outer diameter $D_o$ of the metal tube 52 is slightly larger than an inner diameter $D_i$ of the first layer 26. Thus, when the metal tube 52 is inserted into the hose 16, the first layer 26 expands. The material selected for the first layer 26 contributes to the tight fit of the connection. For example, the hose 16 may have a first layer 26 made of thermoplastic elastomer. The thermoplastic elastomer is relatively flexible and resilient. The resiliency of the thermoplastic elastomer of the first layer 26 under compression provides a sealing force between the first layer 26 and the tube 52 for a tight and leak-free connection. The hose 16 in this example is shown only with the layers 26, 31, and 32, however, it is to be understood that any of the disclosed example constructions of the hose 16 may be used.

In another example, the braid angle of the fiber strands 30 is preselected to provide a desirable hose 16 characteristic, such as an amount of resistance to insertion of the tube 52 into the hose 16. The braid angle corresponds to an amount of movement of the fiber strands 30 during insertion of the tube 52 and in turn to the resistance of the hose 16 to insertion of the tube 52. A relatively large amount of fiber strand 30 movement allows the hose 16 to expand when the tube 52 is inserted, and therefore provides less resistance to insertion. A relatively small amount of fiber strand 30 movement does not allow as much expansion of the hose 16 when the tube 52 is inserted, and therefore provides more resistance to insertion. In one example, a relatively small angle (e.g., approximately 40°) provides less resistance to insertion of the tube 52 into the hose 16. A relatively larger angle (e.g., an angle of about 60°) provides for more resistance to insertion of the tube 52 into the hose 16.

Figure 5:
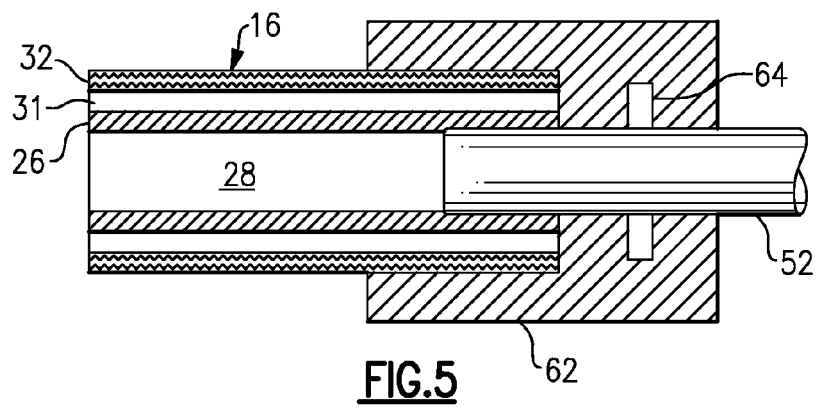
FIG. 5 shows another example assembly between a hose and a tube.

Referring to FIG. 5, the connection between the hose 16 and the tube 52 includes an overmolded portion 62 to attach the hose 16 and tube 52 together. Likewise, the overmolded portion 62 may be used with a crimped connection (e.g., FIG. 3). In this example, the tube 52 includes a lock feature 64, such as a rib. The overmolded portion 62 is molded over the lock feature 64. The mechanical locking between the lock feature 64 and the overmolded portion 62 resists pull-out separation of the tube 52 and hose 16. In other examples, the lock feature 64 is a ring or surface texturing, such as knurling.

In one example, the overmolded portion 62 is made of a thermoplastic material. In a further example, the thermoplastic material used for the overmolded portion 62 is the same the outermost layer of the hose 16 to promote a strong bond between the overmolded portion 62 and the hose 16.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

We claim:

1. A hose for use in a fluid transfer system, the hose comprising:
   a first layer including a plastic material with an electrically conductive material dispersed therein; and
   a second layer bonded to the first layer and comprising fiber strands located radially outward of the first layer, the second layer being free of a matrix material between the fiber strands, wherein the fiber strands include polyester, polyaramid, aromatic polyamide, glass, Kevlar®, graphite or combinations thereof.

2. The hose as recited in claim 1, wherein the plastic material includes a polyamide, polyester, polyolefin, fluoropolymer, polyphenylene sulfide, polyphthalamide, a thermoplastic elastomer, or combinations thereof.

3. The hose as recited in claim 1, wherein the first layer comprises an electrical resistivity between approximately $10^2$ and $10^7$ ohm/sq.

4. The hose as recited in claim 1, wherein each of the fiber strands individually includes a coating thereon.

5. The hose as recited in claim 1, further comprising a third layer bonded to the second layer and that includes a polymer material, the third layer located radially outwards of the first layer.

6. The hose as recited in claim 5, wherein the third layer includes a first sublayer and a second sublayer, and the first sublayer includes a first material and the second sublayer includes a second material that is different from the first material.

7. The hose as recited in claim 5, wherein the polymer material includes a thermoplastic, a thermoplastic elastomer, a thermoset elastomer, an elastomer, or combinations thereof.

8. The hose as recited in claim 5, wherein the polymer material includes a polyamide, a thermoplastic elastomer, a thermoplastic urethane, chloroprene rubber, nitrile rubber, styrene-butadiene rubber, ethylene-propylene rubber, butyl rubber, ethylene acrylic rubber, Amfac®, chlorinated polyethylene rubber, or combinations thereof.

9. The hose as recited in claim 5, further comprising a fourth layer located radially inwards of the first layer.

10. The hose as recited in claim 9, wherein the fourth layer includes an electrically conductive material dispersed therein.

11. The hose as recited in claim 9, wherein the fourth layer includes a fluoropolymer, polyamide, polyolefin, polyester, polyphenylene sulfide, polyphthalamide, a thermoplastic elastomer, or combinations thereof.

12. The hose as recited in claim 9, further comprising a fifth layer located radially inwards of the fourth layer.

13. The hose as recited in claim 12, wherein the fifth layer includes an electrically conductive material dispersed therein.

14. The hose as recited in claim 12, wherein the fifth layer includes a fluoropolymer, polyamide, polyolefin, polyester, polyphenylene sulfide, polyphthalamide, a thermoplastic elastomer, or combinations thereof.

15. The hose as recited in claim 1, wherein the fiber strands are spiral wound about the first layer.

16. The hose as recited in claim 1, wherein the fiber strands are knitted or braided about the first layer.

17. The hose as recited in claim 16, wherein the fiber strands form an angle relative to a longitudinal axis of the hose, and the angle is between about 40° and 60°.

18. The hose as recited in claim 17, wherein the angle is about 55°.

19. The hose as recited in claim 1, wherein the hose is secured to a tube with a connector.

20. The hose as recited in claim 19, wherein the connector includes a crimped ferrule.

21. The hose as recited in claim 19, wherein the connector includes a plastic overmold that at least partially surrounds respective ends of the hose and the tube.

22. The hose as recited in claim 21, wherein the tube includes a rib extending therefrom that mechanically interlocks with the plastic overmold.

23. The hose as recited in claim 19, wherein the metal tube is fluidly connected with at least one of a vehicle engine, a vehicle fuel vapor management system, a vehicle transmission, or a vehicle transmission fluid cooler.

24. The hose as recited in claim 1, wherein the fibers strands are arranged as a fabric.

25. The hose as recited in claim 1, wherein the second layer is adhesively bonded to the first layer.

26. The hose as recited in claim 1, wherein the fiber strands are coated with an adhesive coating to bond the second layer and the first layer together.

27. The hose as recited in claim 26, wherein the adhesive material is made of a plastic having the same composition as the plastic material of the first layer.

28. The hose as recited in claim 1, wherein each individual fiber strand includes an adhesive coating around the respective fiber strand that bonds the second layer and the first layer together.

29. The hose as recited in claim 1, wherein the fiber strands are moveable relative to each other in response to insertion of a tube into the hose.

30. The hose as recited in claim 1, wherein the second layer is mechanically bonded to the first layer.

* * * * *